Nov. 12, 1940.  M. PIACENTINI  2,221,606
SIGNALING SYSTEM FOR NIGHT LANDING OF AIRCRAFT
Filed April 14, 1937  2 Sheets-Sheet 1
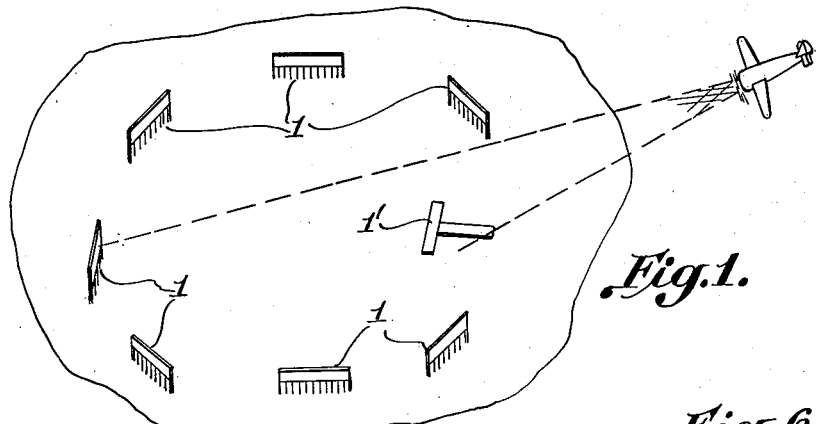
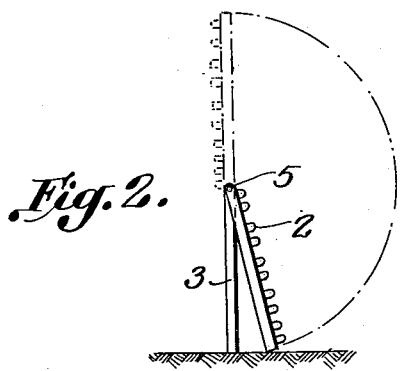
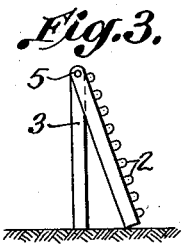
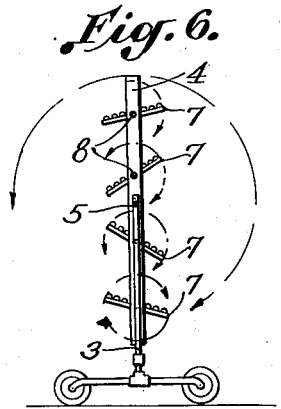
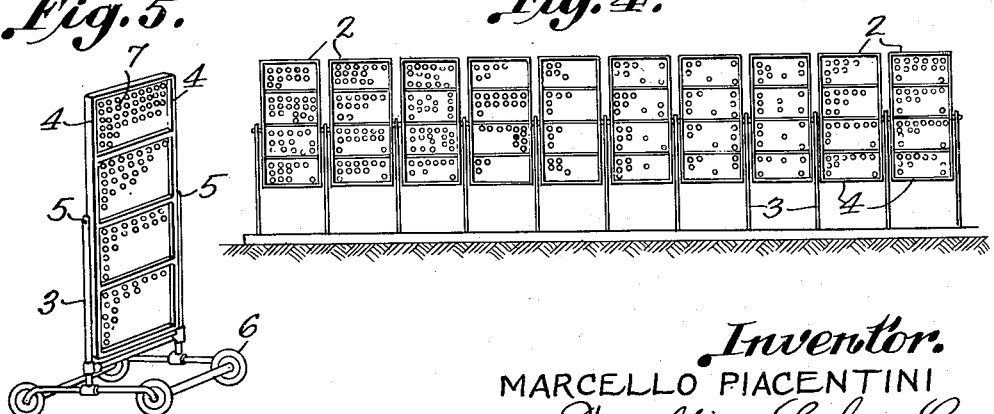
Inventor.
MARCELLO PIACENTINI
By Haseltine, Lake & Co.
Attorneys Nov. 12, 1940.　　　　M. PIACENTINI　　　　2,221,606
SIGNALING SYSTEM FOR NIGHT LANDING OF AIRCRAFT
Filed April 14, 1937　　　2 Sheets-Sheet 2
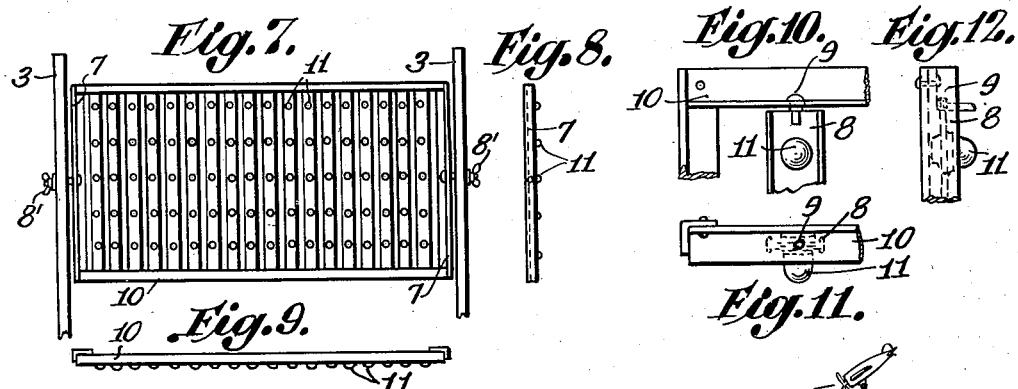
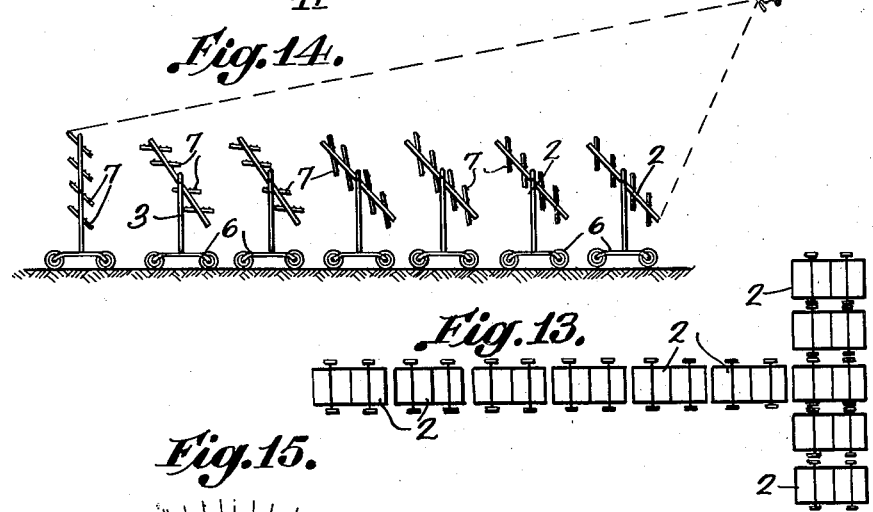
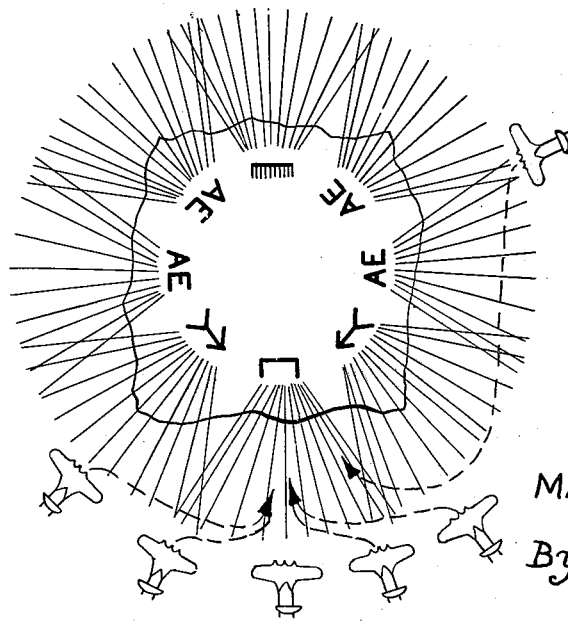
Inventor:
MARCELLO PIACENTINI
By Haseltine, Lake & Co.
Attorneys Patented Nov. 12, 1940

2,221,606

UNITED STATES PATENT OFFICE 2,221,606

SIGNALING SYSTEM FOR NIGHT LANDING OF AIRCRAFT

Marcello Piacentini, Genoa, Italy

Application April 14, 1937, Serial No. 136,770
In Italy April 22, 1936

5 Claims. (Cl. 40—130)

The present invention is a signaling system making use of frames provided with secondary light elements of the reflecting, refracting or reflecting and refracting type, which become visible at night on being struck by the light rays issuing from aircrafts in flight provided with lights installed thereon. The present system does not require the use of direct light sources installed on the landing or mooring ground, said reflecting frames being placed all round the landing or mooring field near the boundary thereto, one in front of the other, in diametrically opposed pairs, each frame being formed with elements arranged so as to form preferably a complex of rectangular form, either connected together or independent one from the other.

Each frame or complex of frames together with the frame or complex of frames in front of it and forming with it a "diametrical pair" serves for determining the necessary data for landing on the ground or alighting on the water of the aircraft, said data being:

(a) The perception of the distance and of the height of the aircraft from and over the landing field; (b) the boundary of the landing, which is defined by said frames; (c) the horizon, which is indicated by the horizontal axis of each frame or complex of frames, and finally the direction, given by the line connecting two opposite frames of a diametral pair as before explained.

Each frame is composed of a certain number of fixed and movable portions, or completely of these latter, so that it may be transformed on the landing field in a reflecting sign having a T, C, U or L shape, or having the form of an arrow, of alphabetic letters or numerals, or any other form that may be desired, depending on local circumstances and contingencies. The reflecting frames may either be placed permanently on the field or may be wholly or partly movable around the field, so that the pairs of diametrically opposed frames may if required be reduced down to one pair only.

The transformation above mentioned of a frame, in a reflecting sign of various forms on the ground is effected in accordance with the direction of the wind at the moment in which the aircraft is landing, as well as in dependence of other circumstances, the direction of landing or alighting being given by the line running from said transformed frame to the non transformed frame disposed diametrically opposed to it.

The signaling system according to the present invention comprises also the use of complementary reflecting lights or signs disposed on the landing or mooring field between the pairs of frames above described forming a diametrically disposed pair, or along the extension of the said connecting line, between said pair.

These complementary reflecting elements or signs may also be disposed on the field so as to form any desired sign or shape, of any dimension and in any numbers, and may be placed on the landing field or on the mooring water space, both raised from the ground or floating or emerging from the water, said complementary signs forming a whole with the plurality of frames above mentioned.

The invention comprises also the use, in a landing or mooring field, of only said complementary reflecting elements or signs (which, like the frames are formed only a plurality of reflecting lights or signs), these complementary elements being disposed round the periphery of the landing or mooring field, and (or) in such manner within said landing or mooring field, so as to form signs, figures, lines or trails of a size and length corresponding to about the length of the landing or mooring space required by the aircraft on landing or mooring; said complex or banks of complementary signs or lights being disposed either parallel, or normal or oblique with respect to each other, and so that they may be oriented according to the direction of the wind or in dependence of other factors, their function and purpose being similar and equivalent to the systems formed with pairs of diametrically opposed pairs of reflecting frames above described.

The invention comprises also the use of signaling by means of a plurality of reflecting elements or secondary lights disposed on the landing or mooring field so as to form the shape of an arrow, of alphabet letters, of numerals, or of any other geometrical shape or form having particular conventional meaning. These signals are formed either permanently by using a certain number of reflecting frames as complementary lights or signals such as above described or intermittently, as lighting signals produced by means useful for the purpose, so as to communicate news or information to the aircraft in flight or in course of landing, according to a preestablished known or secret code. Complementary reflecting lights or signs both grouped or singly, may also be disposed outside the landing or mooring field, in particular and prearranged position with respect to the frames or complex of complementary lights on the field or both, with which said outside lights or signs, form a complete signaling complex, or said lights or signs may be disposed so as to replace the reflecting frames round the landing or mooring field by utilising a portion of these latter either by suitable movements of the elementary lights of which they are composed, or by means of movable marks or screens placed over said elementary lights, so that from the aircraft, only a given portion of the frames or of the plurality of complementary reflecting signs can be seen or to make alternately visible and invisible from the aircraft a portion of said figures, or letters or numerals by intermittent lightning flashes, at more or less long intervals of time according to a predisposed code.

According to the invention, direct light sources can be used in and out of the landing or mooring field, in one or more predetermined positions with respect to the secondary or reflecting light signs above described, in any of the arrangements above described of these latter, with which they form therefore a sole complete system; said direct sources of light having also particular conventional or secret meanings in relation with the said reflecting signs above described.

In the following description, the terms "reflecting frame" and "reflecting element" will be used to indicate respectively a plurality of reflecting elements or signs disposed in a conventional geometrical form as before described, and an optical glass or lense of any known type capable of reflecting light in substantially the same direction as that of the beam of light by which it is struck, said reflected beam of light being comprised within certain angles according to the type of reflecting lenses used and to the effects to be obtained in signalling, said reflecting lenses being preferably adapted so as to obtain a very high reflecting power within a restricted angular field so that the maximum visibility in height may not be more than one fifth of the maximum distance of visibility, it being understood that the word "height" is intended to mean the altitude over the ground or water of the aircraft at the point on which it is flying on sighting the signals, these latter being disposed so as to be visible only from a certain predetermined direction, the visibility from all other directions being excluded.

The accompanying drawings show by way of example and for the purpose of illustrating the present invention, some forms of frames and other reflecting signals, and their different arrangements on the landing ground or mooring field.

In the drawings:

Fig. 1 shows substantially a perspective plan view of a landing field at the periphery of which are placed a number of rectangular reflecting frames disposed as a compass' quadrant, one of said frames being transformed in the shape of a T.

Figures 2 and 3 show in end elevation the system for overturning into vertical position the central portion of the frame for transforming it into a T.

Fig. 4 shows in front elevation a plurality of independently and pivotally mounted reflecting sections each in a frame, the entire assemblage constituting a composite frame secured to the ground.

Fig. 5 shows in perspective a single or one of the movable reflecting sections of the composite frame illustrated in Fig. 4, but mounted on wheels instead of secured to the ground.

Fig. 6 shows the side view of a similar reflecting unit shown in Figures 4 and 5, but wherein each reflecting section 7 is individually mounted to rotate on a horizontal axis 8', as distinguished from a plurality of reflecting sections pivotally mounted as a unit as illustrated in Figs. 4 and 5.

Figs. 7, 8 and 9 show respectively in front and side views and in plan, one of the rotable frames shown in Fig. 6, formed with bands or ribbons rotatable round their longitudinal axis, carrying a plurality of reflecting elements or lenses.

Figures 10, 11 and 12, show respectively in front and side views and in plan, in an enlarged scale, the particulars of the attachment of said bands or ribbons carrying the reflecting elements.

Figures 13 and 14 show schematically in plan view and in elevation, the disposition on the ground of a frame transformed in a T, formed with a number of movable reflecting sections.

Fig. 15 shows schematically in plan, a landing field indicated by four diametrically opposed pairs of reflecting frames, one of which is formed with a rectangular frame disposed normally, and with a frame transformed into a C, opposed to the first, the other three pairs being disposed so as to form alphabetic letters and arrows, which form with the first mentioned pair a sole signal unit.

Fig. 16 shows in elevation an optical reflecting element or lens, adapted for use in the devices according to the invention.

In Fig. 1, the boundary of the landing field is indicated with a plurality of frames or reflecting units 1, disposed symmetrically relatively to the centre of the field, so that each reflecting frame 1, has a corresponding reflecting frame diametrically opposed to it. The directions of the lines connecting the opposed pairs of frames above mentioned, are preferably disposed according to the quadrant of the compass, or according to the general direction of the wind in the locality. In said figure, one of the reflecting frames is shown in 1' transformed in a T, in order to indicate to the aircraft about to land the direction of landing or mooring indicated by the line connecting the frame transformed in a T, and the non-transformed frame diametrically opposed to it.

All the above mentioned frames have their reflecting frame facing outside the field, excepting the two frames forming the diametrically opposed pair indicating the direction in which the aircraft is to land, said pair of frames having both their reflecting faces directed towards the side and direction from which the aircraft is expected to arrive for landing or mooring. It will however be understood that all frames or complexes of frames placed on the field, may have their optical reflecting element disposed on more than one side, so as to be visible simultaneously from any direction desired.

Figures 2 and 3 show respectively in end elevation, a form of a reflecting frame in normal position and a frame in folded position. The frame is mounted on a detachable setting supported by uprights 3 driven into the ground, and comprises a frame portion 2 provided with reflecting elements, pivotally mounted on the horizontal pivots 5, so that it may be overturned towards the inner side of the field, as shown.

Fig. 4 shows in front elevation another form of transformable reflecting frame, comprising a number of rectangular portions or sections 2, independent one from the other, which may be either driven separately in the ground or mounted separately on wheel trucks, as shown in Figs. 5 and 6. The detached rectangular sections 2 may be disposed on the ground so as to form a T as above described, said T being shown in a slightly different shape in Fig. 13.

In Fig. 5 a frame is shown mounted on uprights 3 so as to allow it to rotate about the pivots 5. The uprights 3 may be fixed on the ground as shown at 4 in Fig. 4 so as to facilitate the displacement of the frame, which may also be placed or fixed on the ground or on the water.

Fig. 6 shows an end elevation of a frame, similar to that shown in Fig. 5, formed with a number of rotatable sections 7 disposed one above the other and mounted on the frame setting 4 by means of the pivots 8' which allow the rotation about their respective horizontal axes, so that each section 7 may assume any inclination desired with respect to the vertical.

Figures 7, 8, 9, 10, 11 and 12 show one of said reflecting sections 7 (of the type as shown in Fig. 6) formed with a number of strips or tapes 8 disposed side by side to each other, normally, to the axis of rotation of the rotatable section 7. Each strip or tape 8, can rotate round its longitudinal axis on pivots 9 (Figs. 10, 11 and 12) inserted on the horizontal rods 10 forming said section, said strip or tape 8 having inserted thereon a suitable number of reflecting elements or lenses 11. Figures 10, 11 and 12 show in enlarged scale and in detail the parts above described.

From the preceding description it will be clear that the construction of the reflecting frame according to the invention is adapted to orientate the reflecting elements (or secondary sources of light) carried by it, in any position desired of the vertical plane passing through its longitudinal axis, thus causing the signal to be visible from any desired direction, and only from these directions, and also to restrict at will the angular field of visibility.

Figure 13 shows schematically in plan, a plurality of movable frame sections 2 according to the invention, placed on the ground so as to form a T, all being disposed with their reflecting face turned in the direction from which the aircraft is expected to land or to alight on the water. The movable sections 7 of each frame are set at different angles by rotating them round their horizontal axes 8' through suitable angles so as to facilitate their being viewed from the aircraft, or they may be disposed so as to be visible only from reduced heights and only through small angles of visibility. At the same time, the strips or tapes 8, carrying the reflecting elements or lenses 11, may be orientated at suitable angles on both sides of the plane normal to the plane of the frame or frame section 7, by turning them round pivots 9, so as to cause the signal to be viewed from the aircraft also in case this latter should aproach the landing point from a direction somewhat oblique to said normal plane.

Obviously, reflecting signals of any other shape or form may be formed, with the said frame sections, shaped for example as arrows, as numerals or as alphabetic letters, it being understood that the invention comprises reflecting signals formed with any possible combination or disposition of reflecting frames or frame sections which may have a permanent or temporary character.

Of course, the aircraft may alight on the ground or on the water at either side of the banks of complementary reflecting elements or in the space comprised between two parallel banks of said complementary elements; the aircraft may also alight directly over said elements, as these are constructed so as not to damage nor to be damaged by the aircraft, as hereinafter described. It will also be understood that said complementary elements may also be disposed on the landing ground or water basin in any other suitable and equivalent manner, their function being complementary to that of the reflecting frames or frame sections, with which they form a single signal unit.

In the reflecting signals according to the invention, the reflecting elements with which they are provided are so constructed and arranged that the angular field of visibility of each of said reflecting signals 1, in the horizontal plane is of an amplitude which is sufficient for reaching the angular field of visibility of the subsequent reflecting signal, as clearly shown in Figure 15, so that the aircraft is enabled to sight from any directions it may arrive, one or more reflecting signals as soon as it has entered into the maximum distance or zone of visibility, and when it has entered this zone, the signals above described will indicate to the pilot the necessary data for alighting. The signals above described may be transformed by moving the frames or portions thereof on the landing field or by superposing on the whole or a portion of said signals controllable screens or the like which can be moved from one signal to another. These screens may also be applied on the signals used in connection with alighting water spaces, it being understood that the invention comprises also other arrangements of reflecting frames or portions thereof, or reflecting elements both singly and in a plurality, having both a permanent character or acting intermittently or as flashes.

Hence, variously arranged lights can be placed in or in the neighborhood of the landing field, in any number, colour and position, and establishing with a pre-determined code, the significance or meaning of the disposition of said direct lines in relation with the reflecting light above described, with which they form a sole signalling system, both in landing grounds or in water spaces designed for the alighting of aircraft.

Fig. 16 shows in elevation a type of a reflecting element or lens, adapted for use in the signals according to the invention. This element is formed with a biconvex lens 35, to the underside of which a metallic spherical mirror 36 is fixed by means of a strong metal boss 37, suitably encircling the lens 35. The size and the optical characteristics of the element are so designed as to obtain a highly reflecting power in a restricted angular field, viz. of about 25°, round its axis. It has to be understood however, that any other type of optical device having a catoptric diorptic or mixed characteristics of any known type, may be used in connection with the invention.

One of the principal advantages of using the reflecting signals both in groups or isolated, as above described, consists in that these signals can be sighted from a great distance and from relatively small heights, and that in the system according to the invention, the maximum height at which the reflecting signals may be sighted does not exceed one fourth of the maximum distance of visibility.

Thus for example, if the signals are visible from a maximum distance of 3000 metres, the maximum height at which they will be visible will not exceed 750 metres, while this latter may be reduced at will down to a minimum, or to a height practically suitable comprised within 300 metres from the ground, the term "height" being intended to mean the altitude of the aircraft from the point over which it is flying on sighting the signals.

Having now fully described my invention, I claim:

1. A night signaling system for aircraft landing fields comprising in combination: a plurality of movable signal units each comprising a portable frame member adapted to be selectively placed relative to said field and to another frame member, each of said frame members having a light reflecting element secured thereto for reflecting the light cast thereon by the headlights of an approaching aircraft, said movable signal units being adapted to be arranged in respect to said field so as to form predetermined variable signal assemblages, said units being disposed about the landing field in various relations wherein the signal elements on one frame may be transformed relative to the signal elements on another frame, whereby to transmit variable information to said aircraft including direction and location of a landing space defined by said frame members.

2. A night signaling system for aircraft landing fields comprising in combination: a plurality of movable signal units each comprising a portable frame member adapted to be selectively placed relative to said field and to another frame member, each of said frame members having a light reflecting element secured thereto for reflecting the light cast thereon by the headlights of an approaching aircraft, said movable signal units being adapted to be arranged in respect to said field so as to form predetermined variable signal assemblages, said units being disposed about the landing field in diametrically opposed pairs wherein one unit faces another and wherein one frame of a pair is transformed so as to constitute with its oppositely disposed frame an assemblage displaying one of said variable signals, whereby to transmit information to said aircraft and the direction and location of a landing space defined by said frame members.

3. A night signaling system for aircraft landing fields according to claim 1 wherein said light reflecting elements are independently and rotatably mounted on said frame members so that a light reflecting element of one frame member is adapted to occupy a different position on its frame relative to the position of a light reflecting element of another frame member, for the purpose described.

4. A night signaling system for aircraft landing fields according to claim 2 wherein each frame member carries a plurality of independently and rotatably mounted signal elements.

5. A night signaling system for aircraft landing fields according to claim 1, wherein each signal unit comprises a plurality of frame members rotatable about individual horizontal axes and wherein a plurality of signal elements carried by each frame member are rotatable relative thereto and about longitudinal axes, whereby to expose a prearranged variable signal to view from any desired direction.

MARCELLO PIACENTINI.